United States Patent [19]

Stillwagon

[11] 4,276,507
[45] Jun. 30, 1981

[54] HOMOPOLAR MACHINE FOR REVERSIBLE ENERGY STORAGE AND TRANSFER SYSTEMS

[75] Inventor: Roy E. Stillwagon, Ruffsdale, Pa.
[73] Assignee: U.S. Department of Energy, Washington, D.C.
[21] Appl. No.: 874,978
[22] Filed: Feb. 3, 1978

Related U.S. Application Data

[62] Division of Ser. No. 585,642, Jun. 10, 1975, Pat. No. 4,110,648.

[51] Int. Cl.² .............................................. H02K 7/02
[52] U.S. Cl. .......................................... 322/48; 322/4; 310/178
[58] Field of Search ............................ 322/4, 48, 100; 310/178

[56] References Cited
U.S. PATENT DOCUMENTS

| | | | |
|---|---|---|---|
| 2,531,028 | 11/1950 | Christofilos | 322/4 X |
| 2,997,641 | 8/1961 | Baker et al. | 322/48 |
| 3,029,199 | 4/1962 | Baker et al. | 322/48 |
| 4,077,678 | 3/1978 | Studer et al. | 310/178 X |
| 4,086,506 | 4/1978 | Kustom et al. | 310/178 X |

Primary Examiner—Robert J. Hickey
Attorney, Agent, or Firm—J. R. Campbell; Z. L. Dermer

[57] ABSTRACT

A homopolar machine designed to operate as a generator and motor in reversibly storing and transferring energy between the machine and a magnetic load coil for a thermo-nuclear reactor. The machine rotor comprises hollow thin-walled cylinders or sleeves which form the basis of the system by utilizing substantially all of the rotor mass as a conductor thus making it possible to transfer substantially all the rotor kinetic energy electrically to the load coil in a highly economical and efficient manner. The rotor is divided into multiple separate cylinders or sleeves of modular design, connected in series and arranged to rotate in opposite directions but maintain the supply of current in a single direction to the machine terminals. A stator concentrically disposed around the sleeves consists of a hollow cylinder having a number of excitation coils each located radially outward from the ends of adjacent sleeves. Current collected at an end of each sleeve by sleeve slip rings and brushes is transferred through terminals to the magnetic load coil. Thereafter, electrical energy returned from the coil then flows through the machine which causes the sleeves to motor up to the desired speed in preparation for repetition of the cycle. To eliminate drag on the rotor between current pulses, the brush rigging is designed to lift brushes from all slip rings in the machine.

5 Claims, 7 Drawing Figures

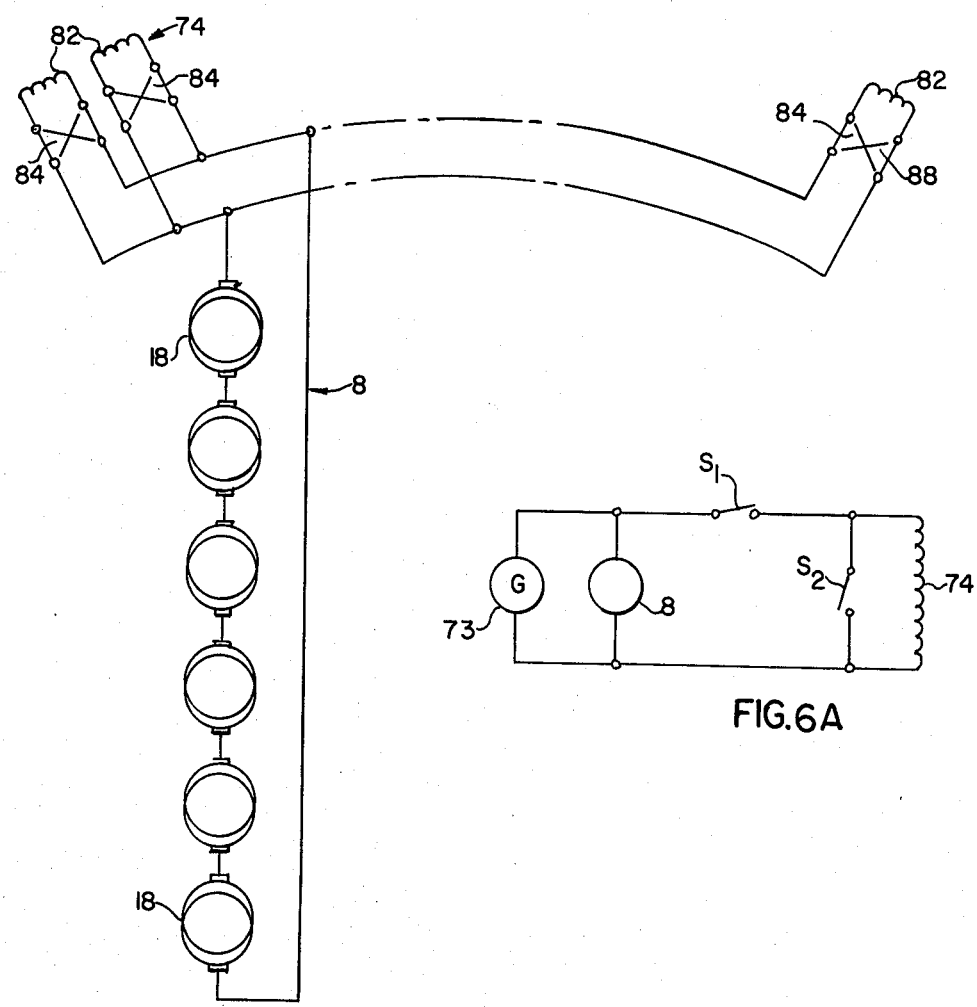
FIG.5.
FIG.6A.
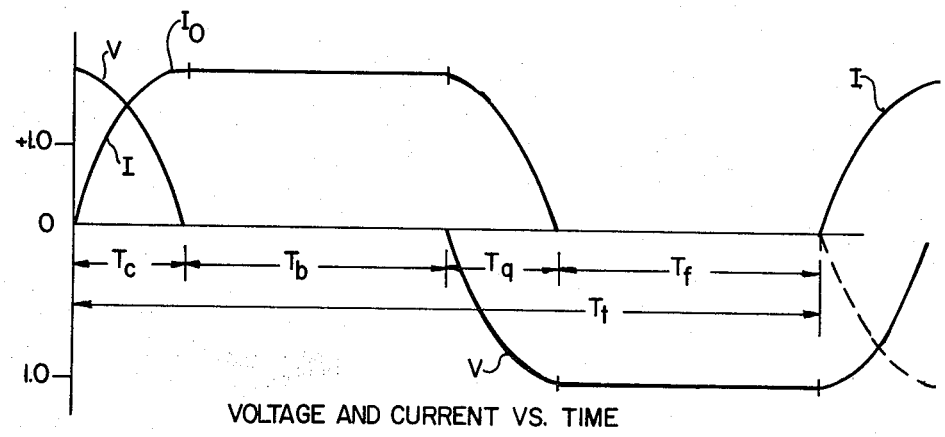
FIG.6B.
VOLTAGE AND CURRENT VS. TIME

HOMOPOLAR MACHINE FOR REVERSIBLE ENERGY STORAGE AND TRANSFER SYSTEMS

GOVERNMENT CONTRACT

The invention described herein was made in the course of or under subcontract No. LN4-44177, between Los Alamos Scientific Laboratory and Westinghouse Electric Corporation.

This is a division of application Ser. No. 585,642 filed June 10, 1975 now U.S. Pat. No. 4,110,648.

BACKGROUND OF THE INVENTION

The invention described herein relates to dynamoelectric machines and more particularly to a homopolar generator-motor useful in reversibly storing and transferring energy in a thermo-nuclear reactor power generation system.

Homopolar machines conventionally are designed to produce high current, low voltage power to loads demanding very large direct currents, such as that required in metallurgical or research applications. Because the machine armature moves in a field of unchanging polarity, it generates DC power without the need for commutation, and it is this characteristic which makes the generator particularly attractive in supplying very large pulses of direct current to connected loads.

One such load represented by a fusion reactor, operates on the principle of plasma heating and confinement which requires high energy storage and transfer systems. These systems act to rapidly pulse the reactor magnetic field or load coils which compress and confine the plasma as the energy is transferred between the electrical power source and reactor load coils. Should the power source comprise a homopolar machine, the machine must operate at unusually high power densities, and the energy pulses must be transferred under very low loss conditions and in extremely short time periods, e.g., in tens of milliseconds. This energy transfer time represents the ratio of stored energy in the machine to the average power level during the pulse. In conventional homopolar machines, the ratio or transfer time, is two orders of magnitude greater than the short time requirements established for efficiently pulsing the magnetic load coils of fusion reactors.

Consideration has been given to the use of conventional homopolar machines to pulse the reactor load coils to achieve the desired reactor performance. In such an arrangement, the homopolar machine is connected to the fusion reactor load coils through a series switch and when the machine current reaches the desired value and is transferred to the coil, a shunt switch across the coil is closed to short it through a low resistance path and thus confine the current to the coil. However, at this particular instant in the cycle, voltage will still appear on the rotor winding because the mass represented by the machine rotor will cause the rotor to continue rotating. It is apparent that as rotor rotation continues with the field winding energized, the rotor conductors cut flux and continue to generate a voltage until the rotor stops.

Therefore, at the instant the shunt switch is closed, it also is necessary to open the series switch and disconnect the homopolar machine from the load to prevent its rotor from being shorted by the shunt switch. Since a high dc current at high voltage is still on the machine, it is evident that an extremely large interrupting series switch would be required to open the circuit. If such a switch could be designed, the loss of energy associated with the interruption would nevertheless be so great that it would not be compatible with the efficiency requirements for the system. For these reasons conventional homopolar machines cannot effectively satisfy fusion reactor load coil requirements because the machine design and characteristics preclude matching the energy stored in the machine with the energy to be transferred to the reactor load coils.

SUMMARY OF THE INVENTION

Briefly stated, the present invention eliminates the above disadvantages by providing a homopolar generator-motor which generates and stores energy as rotational kinetic energy, delivers the energy electrically to a magnetic load coil and then acts as a motor to accept electrical energy from the magnetic load coil to accelerate the rotor and again store kinetic energy before repeating the next cycle. The homopolar generator-motor includes a stator enclosing a rotor divided into separate rotor modules which rotate in opposite directions. Each module is of hollow sleeve or shell construction having a radially thin shell wall and mounted for rotation on appropriate bearings. Excitation coils concentrically disposed around the stator near the ends of each rotor module provide the flux system necessary for generating very large direct currents.

This current is removed from the machine and transferred through a switch to magnetic load coils peripherally wound on a core used in the fusion reactor. A shunt switch across the load coil provides a low resistance path for the circulation of current through the coils during the time plasma is being confined. The coil energy returned to the homopolar machine causes it to act as a motor to again store the kinetic energy needed in the system. Additional current from a remote source may be added to supplement that returned from the coils to thus bring the rotor up to its design speed. An important consideration in the design resides in selecting machine proportions such that the energy stored will match the amount of current transferred to the magnetic load coils.

An object of the invention therefore is to provide an efficient and economical homopolar machine wherein the energy stored in the machine substantially matches on a 1 to 1 basis, the amount of energy to be transferred to a load.

Another object of the invention is to provide an economical and efficient homopolar machine which stores energy and reversibly transfers such energy frequently and rapidly with less than ten percent energy loss in the system.

Another object of the invention is the provision of a homopolar machine having a multiple segmented rotor wherein adjacent rotor modules rotate in opposite directions.

Another object of the invention is to provide a homopolar generator motor which acts as a generator to provide energy to a connected load, and as a motor which receives energy from the load during the second part of each cycle.

BRIEF DESCRIPTION OF THE DRAWINGS

While the specification concludes that claims particularly pointing out and distinctly claiming the subject matter of the invention, it is believed the invention will be better understood from the following description taken in connection will the accompanying drawings wherein:

FIG. 5 is a schematic showing illustrating how homopolar machines are connected to a compression or magnetic load coil of a thermo-nuclear reactor;

FIG. 6a is a simplified showing of the fundamental circuit used for transferring system energy between homopolar machines and a magnetic load coil; and FIG. 6b shows the relationship between voltage and current during the time power is transferred between the homopolar machines and the reactor load coil.

DESCRIPTION OF THE PREFERRED EMBODIMENT

To help facilitate an understanding of the invention, the homopolar generator-motor described herein is designed for use with high energy storage and transfer systems.

The energy source is a homopolar generator-motor designed to store energy as rotational kinetic energy, generate to deliver the energy electrically to a magnetic load coil, and then motor to accept electrical energy from the magnetic load coil and again store kinetic energy. The machine proportions are such that the kinetic energy stored matches the amount of electrical energy to be transferred to the load. To rapidly transfer current at high efficiency, this design requires a departure from conventional homopolar machine construction, and in principle, a departure from any conventional motor or generator.

In principle, the highest efficiency is obtained in the rotating element when 100% of the rotor mass is utilized as an electrical conductor. Any dead weight, such as that found in a prior art laminated or solid iron core of a conventional rotor, contributes to the mass, the inertia and the stored rotational energy and it is this mass which reduces system efficiency. To achieve great efficiency, in contra-distinction with the prior art, substantially all of the rotor mass serves as the conductor which makes it possible to transfer almost all of the developed kinetic energy electrically to a load.

Nuclear fusion reactor power plants are illustrative of the systems which require large magnitudes of power and the invention will be described in relation to such systems, but it will be evident as the description proceeds that it is applicable to other types of systems requiring large pulses of power for extremely short time periods. The specific type of power plant chosen to illustrate application of the invention consists very generally of a torus of cylindrical configuration having a magnetic field coil, called a compression or load coil, wound helically in sections on its outer peripheral surface. The torus contains a gas or plasma which is compressed and confined as the compression or load coil is periodically pulsed from a high energy source, such as the homopolar generator-motor. After pulsing, energy remaining in the coil field is reversibly transferred to the energy source to again repeat the pulsing cycle.

Figure 1:
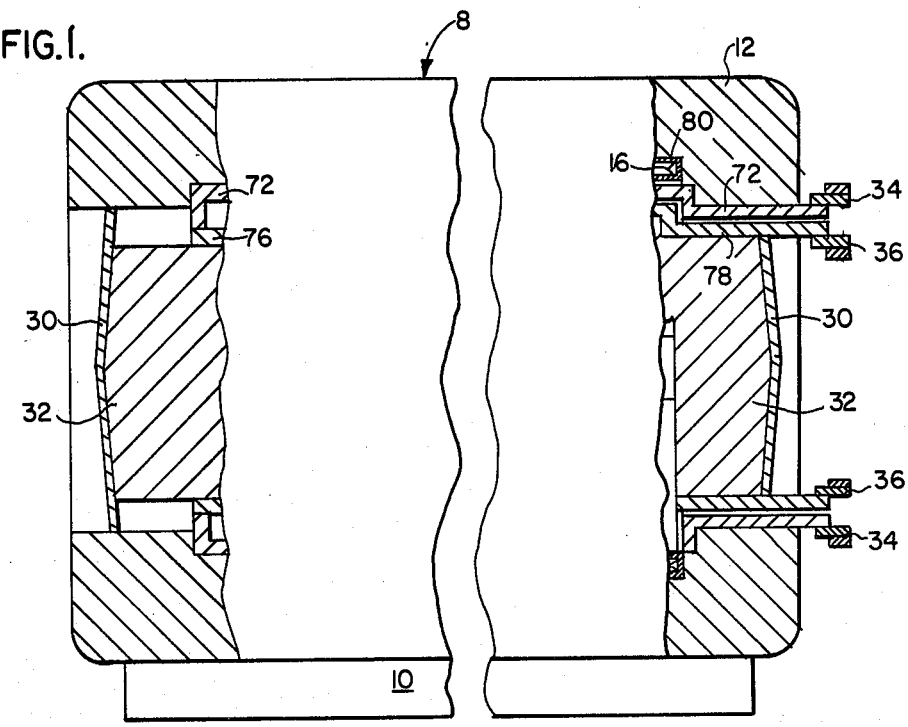
FIG. 1 is a view in elevation, partly in section, of a homopolar generator-motor made in accordance with the teachings of this invention.
Figure 2:
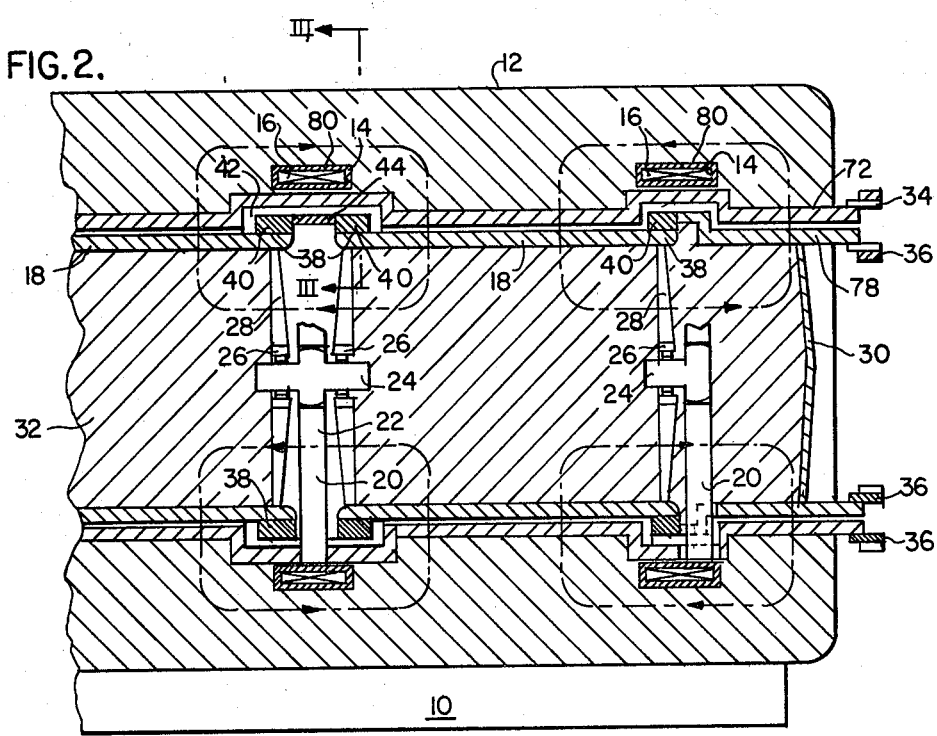
FIG. 2 is a view on elevation, partly in section, of the homopolar generator motor partially illustrating the arrangement of rotor modules and the flux path provided by the stator excitation windings.

Referring now to the drawings wherein like reference characters designate like or corresponding parts throughout the several views, there is shown in FIGS. 1 and 2, a homopolar generator-motor arranged to utilize six modules which operate electrically in series to develop, for example, 10 kilovolts.

The machine 8 comprises a base 10 supporting a stator 12 of solid iron, and depending on the machine length, may be assembled in sections, if desired. Channels 14 formed on its inner peripheral surface receive excitation field windings 16. As shown in FIG. 2, the rotating element in the machine consists of multiple, hollow aluminum sleeves or hollow cylinders 18 having an unbroken outer peripheral surface. These sleeves are modular in construction, and the machine shown to illustrate the invention includes six modules disposed along the machine length.

Each sleeve is supported for rotation in the stator by pedestals 20 secured at their base in the iron stator and include an upstanding bearing support 22 which terminates in axially directed bearing journals 24. Each journal extends into the end of adjacent sleeves 18 as shown. In an alternative arrangement, not shown, the sleeve hubs may be mounted on a single shaft supported from the base at opposite ends of the machine and arranged to extend centrally therethrough. Long shafts used with large machines desirably should be supported from the base at intervals along the shaft length. Hubs 26 mounted for rotation on the journals include radially extending support arms 28 which are welded or otherwise affixed to the inner surface of each sleeve. The support arms 28 may be made of aluminum, steel or other metallic or non-metallic material having a high strength to weight ratio, the highest ratio being most desirable because of the need to minimize weight in the rotating sleeves. Since no mechanical power is transmitted to or extracted from the rotating sleeves, and because the sleeves do not contain conventional slot conductors, no additional structural members are required to absorb electrical and centrifugal forces imposed on the sleeve during operation. Also, to reduce frictional drag, the hub 26 may be mounted on hydrostatic bearings in lieu of sleeve or rolling element bearings. In that case, air for jacking and/or maintaining each sleeve off its journal is supplied from a source through air passages formed in the pedestals 20.

Depending on the conducting material comprising each sleeve, the mean radius to wall thickness ratio should be in the neighborhood of 10:1, the diameter in the specific illustration being two meters with a ten centimeter wall thickness. This design permits a low ratio of stored kinetic energy to electrical power rating (watt-seconds per watt) while maintaining high electrical utilization of the aluminum sleeve, which is fundamental in minimizing joule losses.

It will be noted that a single bearing pedestal and support arms 28 located on opposite ends of the machine support the outermost sleeve modules. Closure plate 30 sealed in opposite ends of the machine permits charging the space therein with a low density gas for minimizing windage and friction losses during sleeve rotation.

To provide a low reluctance path in the machine for flux produced by the excitation coil 14, a stationary solid iron core 32 preferably is positioned inside each rotating sleeve 18. The iron core is supported from stationary journals 24 extending outwardly from the bearing pedestal 20 and its outer surface is spaced from the sleeve 18 inner surface to permit free sleeve rotation during machine operation.

Figure 3:
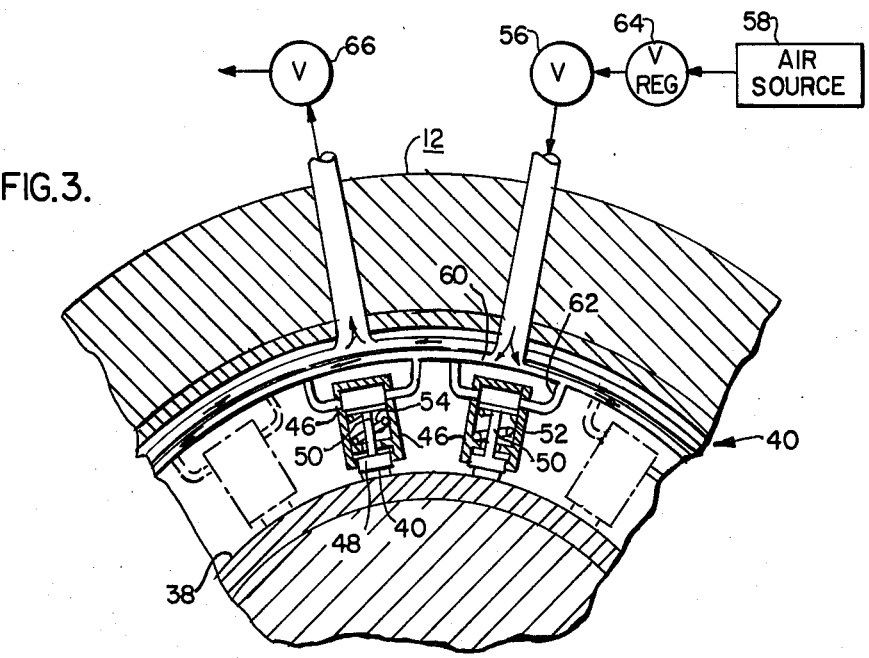
FIG. 3 is a view taken on lines 3—3 of FIG. 2 generally showing the arrangement of brush holders and brushes located near the ends of adjacent rotating modules.

The excitation coils 16 disposed along the stator length are alternately energized in opposite directions to produce the flux distribution shown in FIG. 2. Flux accordingly flows into the first sleeve, out of the second, into the third, and so on, along the machine length. Since flux is distributed in this manner, each sleeve 18 freely rotates in a direction opposite to the next adjacent sleeve. To transfer power from the rotating sleeves to machine terminals 34 and 36, slip rings 38 are mounted peripherally on each end of each rotating sleeve as shown in FIGS. 2 and 3. These slip rings are selectively contacted by current collecting brushes 40, shown in detail in FIG. 3, positioned in the large air gap 42 located inwardly only from excitation windings 16. The brushes are supported and insulated from the stator and extend circumferentially around the stator inner surface. A stationary non-rotating conductor 44, also insulated and supported from the stator, electrically connects the brushes associated with each sleeve, thus placing all sleeves in series. The brushes ride on the copper slip rings or other compatible current collectors 38, on the peripheral surface at opposite ends of the sleeves.

Since portion 42 of the air gap is not used for transferring flux across the sleeve-stator air gap, it can be made sufficiently large to accommodate the brushholders and air piping illustrated in FIG. 3. As described hereafter, the brushes are withdrawn from contact with the slip rings during certain periods of machine operation. As shown in greater detail in FIG. 3, to effect selective retraction of each brush holder 46 and brush 40 from its corresponding slip ring 38, the brush holder body 48 is connected through connecting rod 50 to a piston 52 slidably mounted in brushholder housing 46. Spring 54 normally urges the brushholder body 48 and brush 40 out of contact with slip ring 38 when the sleeve 18 is rotating but not carrying current. When current is to be transferred to stationary conductor 44 for delivery to the rotor terminals 34, control valve 56 is opened and air from air source 58 is supplied through manifold 60 and inlet piping 62 to the top of piston 52, thus moving the brush 40 into contact with the slip ring. Pressure regulator 64 maintains constant pressure on the pistons and control valve 56 remains open during the time of energy transfer from the machine. After such transfer, valve 56 is closed, and vent valve 66 opened to vent pressure from the brushholders. Springs 54 thereupon urge piston 52 upwardly, thereby moving brushes 40 out of contact with the slip ring.

As more fully described hereafter, the brushes remain out of slip ring contact until the next cycle when energy again is transferred from the machine. It will be understood that brushholders 46 are located in air gap 42 and extend completely around the outer peripheral surface of both slip rings on opposite ends of each sleeve. Although a pneumatic system has been disclosed for effecting actuation of the brushes relative to the slip rings, it will occur to those skilled in the art that other actuation means may be used, such as electrically operated solenoids or other devices in air gap 42 which act to move the brushes into and out of contact with the slip rings.

Figure 4:
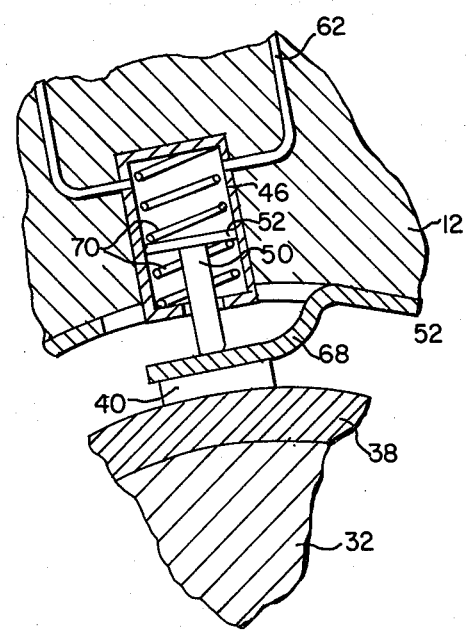
FIG. 4 is a view on elevation partly in section of a modified brush holder and brush arrangement used for transferring current from the ends of rotor modules.

FIG. 4 illustrates an alternative arrangement for lifting brushes 40 from slip ring 38. The brushes 38 are brazed or otherwise fixed on the end of a cantilever arm 68 attached to the stator 12. As in the FIG. 3 design, the brushholder 46 encloses connecting rod 50 attached to piston 52. Springs 70 on opposite sides of the piston are arranged to normally bias the brush out of contact with slip ring 40. Air supplied through inlet 50 moves the brush into engagement with slip ring 40 when desired. The cantilever design provides inertia and mechanical stability while eliminating the frictional effects encountered in conventional brushholders due to electromagnetic forces on the brushes.

As shown in FIG. 2, a stationary cylindrical conductor 72 of copper is mounted on the inner peripheral surface of the stator to complete the circuit in the machine. The copper cylinder of thin wall construction, e.g., 5 centimeter wall thickness, is insulated from but secured to the bore of the stator and is directly connected to stationary sleeve 76 on one end and to stationary sleeve 78 and terminal 36 mounted in the opposite end of the machine, FIG. 1, for receiving return current from the toroidal coil 74 when current is supplied to the load coil through terminals 36. This configuration wherein the sleeves 18 rotate in opposite directions within the stator cylinder 72, with current in opposite directions, is effective in minimizing the machine inductance and the related magnetic energy loss during the energy transfer cycle. Although the conductor 72 is shown as a continuous cylinder in the stator bore, the return circuit desirably comprises a multitude of parallel conductors which are insulated from each other and transposed around the stator inner peripheral surface. This arrangement of transposing conductors to obtain uniform current distribution is well known in the art.

The stationary conductors 44 in the machine air gap portion 42 connect the six rotor modules or sleeves 18 in series when brushes 40 contact slip rings 38, and terminate in terminals 34. The aluminum sleeve slip ring brush tracks require cladding and a more suitable material for current collection, such as copper, may be used. The combination of copper graphite brushes operating on copper slip rings has been used successfully in pulse power applications at current densities up to 5000 amperes per square inch and with 2 to 5 seconds duration per pulse. Since the time for transferring current from the machine described herein to the toroidal coil 74 is much less, i.e., 0.030 seconds, the current density reasonably can be increased to 10,000 amperes per square inch. At this level, each slip ring carries 1100 square inches of brush area. As an alternative, liquid metal may conveniently be used for current collection. The structure utilized for liquid metal current collection may take any one of a number of forms, e.g., the sleeve ends may be equipped with an outwardly projecting flange which rotates in a complementary cavity having liquid metal between the flange and cavity facing surfaces.

The excitation windings 16 are positioned radially outward from adjacent ends of the rotating sleeves and each winding comprises superconducting excitation coils to provide the needed high energy magnetic fields. To achieve superconductivity, the excitation coils are wound with a composite conductor preferably consisting of niobiumtitanium alloy super conducting filaments embedded in a copper matrix with conventional turn to turn insulation and ground insulation. Since extremely low coil temperatures are required, each coil is enclosed in a dewar 80, FIG. 1, which surrounds and thermally isolates the coils which are gas cooled, as with helium. The helium may be circulated in a closed loop either through the dead space defined by the dewar walls or directly in contact with the coil body, and an appropriate refrigeration system used to maintain the desired low temperature obviously may be used for cooling purposes. Such alloyed coil conductors of niobium-titanium cooled as described, are capable of carrying about 1,000 amperes and each winding will develop an mmf of approximately $5 \times 10^6$ ampere turns.

With the windings located on the stator and positioned relative to the rotor modules or sleeves 18 as shown, the stator and the magnetic circuit are segmented in a manner such that each excitation winding produces a magnetic field for adjacent sleeves. The alternate energization of each excitation winding causes the field to alternate in direction, i.e., inwardly and outwardly, with respect to each successive sleeve, thus producing the flux lines of FIG. 2. Also, at initial starting, with the rotor sleeves at standstill, voltage from a separate source is applied across terminals 34 and 36 to produce current flow through each successive sleeve and their interconnecting stationary conductors 44, as shown by the arrows on the sleeves in FIG. 2. Therefore, since the sleeves are connected to maintain current in a single direction, the field established by the sleeve current coacts with the field produced by the alternately energized excitation windings to cause the sleeves to rotate in opposite directions. With this arrangement, the reaction torque on rapid acceleration or deceleration is contained internally of the machine rather than being transmitted to the foundation.

As indicated above, the homopolar machine described is particularly suitable for use with nuclear fusion power plants which utilize a torus for magnetically compressing and confining plasma or gas used to develop heat for ultimate electric power generation. Basically, the machine described herein stores system energy as rotational or kinetic energy, acts as a generator to deliver the kinetic energy electrically to the toroidal compression or load coil, and upon completion of the plasma compression phase, accepts electric energy from the load coil to motorize the machine and again store kinetic energy in preparation for repetition of the cycle. Under this kind and mode of operation, when connected to the load coil, the machine operates in a capacitor mode and as such, is equivalent to a basic LC tank circuit.

FIG. 5 schematically illustrates the general arrangement of connections of a six module machine through suitable switches to the load coil 74. The load coil preferably is wound continuously through a full circle around a torus. The coil is divided into multiple segments 82 and each homopolar generator motor 8 (59 total) of six modules energizes a 10 kv bus which feeds 90 compression coil segments. The coil segments are connected in parallel and are each controlled by four reversing switches 84. The current of 11.25 mega-amps supplied by the machine is therefore divided into 90 circuits with 125 kiloamps per circuit. The corresponding energy per coil segment (15 segments per meter) is 11.92 megajoules which is stored magnetically in the coil during the compression or burn portion of each cycle.

FIG. 6A illustrates the fundamental circuit and includes the machine 8, series switch S1, load coil 74 and shunt switch S2. FIG. 6B shows the voltage and current relationships. With the machine running at 100% speed and 100% voltage, air valve 56 is opened, thus moving brushes 40 into contact with sleeve slip rings 38. Switch S1 is then closed to connect the machine to load coil 74. As shown in FIG. 6B, the current rises to its design crest value $I_O$ in time $T_C$ which according to the load coil and machine parameters is 0.030 seconds. As current reaches its peak, switch S2 is closed, and the current is maintained in the load coil-S2 switch circuit. The energy therefore is stored magnetically in the coil 74 for the time period $T_b$ which is 0.070 seconds. During the time period $T_c$ of 0.030 seconds, all the energy is removed from the machine, the voltage decreases to zero and sleeves 18 come to rest in less than one revolution because all energy has effectively been removed from the machine. The machine remains at rest during the compression time $T_b$.

Upon completion of compression time $T_b$, switch S2 is opened and current is transferred during time $T_q$ from the load coil to the machine via terminals 34, 36 and the cylindrical conductor 72 located in the bore of the stator. This current then coacts with the field from constantly energized excitation windings 16 and accelerates the individual sleeves in opposite directions. Since some losses will occur during the cycle, the slight diminution of energy returned to the machine is made up or supplemented by adding energy from a separate power source 73 during the time $T_f$. Since this energy is added at a relatively low rate, only a few brushes 40 may be placed in contact with the slip rings 38 instead of all brushes to supplement the return energy. The frictional drag which otherwise would be placed on the rotor by the complete set of brushes contacting the sleeve slip rings is eliminated thus imparting greater efficiency to the system. At the end of this phase, air is vented from the brushholders and springs 54 move brushes 40 away from the slip rings.

It is expected that compression coil 74 will be pulsed about every ten seconds and this time is more than adequate to re-accelerate the rotating sleeves up to the desired voltage and speed.

It has been determined that losses in the system with a pulse repetition rate of 1 every 10 seconds is 5.18% of the energy transferred. This includes the homopolar machine losses and the switch losses which together count for nearly 5% of the total. Transmission loss has been included for the voltage drop in the interconnecting cable and bus work as well as the energy input for the refrigeration associated with the superconducting field windings.

The losses for each category are summarized below:

| ENERGY LOSS PERCENT PER CYCLE | |
|---|---|
| Homopolar Machines | 3.42 |
| Switches | 1.56 |
| Transmission | .1 |
| Refrigeration | .1 |
| Total System | 5.18 |

In pulse power applications, and specifically where the stored rotational energy is equal to the electrical energy to be transferred in time T, the minimum loss in the rotor will be realized if 100% of the rotating mass can be utilized as an efficient electrical conductor. This is substantially accomplished in the present invention by utilizing all of the cylindrical sleeves comprising each rotor module, as the conductor.

It will be apparent that many modifications and variations are possible in light of the above teachings. It is therefore to be understood that within the scope of the appended claims, the invention may be practiced other than as specifically described.

What is claimed is:

1. The method of reversibly storing and transferring energy between a homopolar machine and a connected inductive load comprising the steps of:

storing energy in a rotor of a homopolar machine by rotating the rotor at 100% speed and providing 100% voltage at the rotor terminals;

closing a series switch to transfer a current pulse from the rotor to said connected inductive load;

permitting the current to rise in said load to its peak value in time $T_c$ and simultaneously allowing the machine voltage and speed to decrease to zero;

closing a shunt switch across the inductive load to maintain the current therein at said peak value and thereby store the energy magnetically in said inductive load for a time $T_b$;

at the end of time $T_b$, opening said shunt switch and transferring current from said inductive load to the machine during a time $T_q$ to simultaneously permit the transferring current to fall to zero and cause said machine rotor to accelerate substantially to 100% speed and 100% voltage;

opening said series switch; and maintaining said rotor speed and voltage for a time $T_f$ until the series switch is again closed to repeat the cycle.

2. The method according to claim 1 including the step of supplementing current returned to said machine during the time $T_q$ with current from a separate source to cause the machine rotor to reach 100% speed and 100% voltage.

3. The method according to claim 2 wherein the machine rotor includes multiple rotor modules arranged to rotate in opposite directions and are connected in series to current collectors located in the machine air gap, including the further step of maintaining said current collectors in contact with said rotor sleeve modules only during the time $T_c + T_b + T_q$ when current is being transferred between the machine and the connected load.

4. The method according to claim 3 including the step of reversing both the direction of rotation and voltage on the rotor to transfer the current during time $T_c$ in a reverse direction through the machine thereby eliminating reversal of the current and magnetic field in the inductive load for each successive pulse.

5. The method according to claim 4 wherein brushes carried by current collecting brushholders remain in contact with the rotor slip rings during the time $T_c$ in which current is transferred to the load, including the step of lifting said brushes from the rotor surface at the end of time $T_q$ to prevent drag on the rotor, and reapplying said brushes to the rotor slip rings at commencement of the next current pulse.

* * * * *